US009740006B2

(12) United States Patent
Gao

(10) Patent No.: US 9,740,006 B2
(45) Date of Patent: Aug. 22, 2017

(54) ERGONOMIC HEAD MOUNTED DISPLAY DEVICE AND OPTICAL SYSTEM

(71) Applicant: Magic Leap, Inc., Hollywood, FL (US)

(72) Inventor: Chunyu Gao, Tucson, AZ (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 14/024,386

(22) Filed: Sep. 11, 2013

(65) Prior Publication Data

US 2014/0071539 A1 Mar. 13, 2014

Related U.S. Application Data

(60) Provisional application No. 61/699,565, filed on Sep. 11, 2012.

(51) Int. Cl.
*G02B 27/14* (2006.01)
*G03H 1/00* (2006.01)
(Continued)

(52) U.S. Cl.
CPC ..... *G02B 27/0172* (2013.01); *G02B 27/0025* (2013.01); *G02B 2027/011* (2013.01); *G02B 2027/0123* (2013.01)

(58) Field of Classification Search
CPC ............ G02B 27/0172; G02B 27/0149; G02B 27/145; G02B 27/143; G02B 27/0025;
(Continued)

(56) References Cited

U.S. PATENT DOCUMENTS 5,699,194 A 12/1997 Takahashi
5,701,202 A 12/1997 Takahashi
(Continued)

FOREIGN PATENT DOCUMENTS

CN 131958 A 9/2001
CN 102566044 A 7/2012
(Continued)

OTHER PUBLICATIONS

Cheng et al., "Design of an optical see-through head-mounted display with a low *f*-number and large field of view using a freeform prism," *Applied Optics* 48(14):2655-2668, May 10, 2009.
(Continued)

*Primary Examiner* — Dawayne A Pinkney
(74) *Attorney, Agent, or Firm* — Seed IP Law Group LLP

(57) ABSTRACT

Optical systems such as image display systems include a freeform optical waveguide prism and a freeform compensation lens spaced therefrom by a gap of air or index cement. The compensation lens corrects for aberrations which the optical waveguide prism will introduce in light or images from an ambient real-world environment. The optical waveguide prism receives actively projected images at an entry location, and emits the projected images at an exit location after internally reflecting the images along an optical path therein. The image display system may include an image source and coupling optics. The approach permits design of an optical viewing device, for example in optical see-through HMDs, achieving an eyeglass-form appearance and a wide see-through field of view (FOV).

30 Claims, 2 Drawing Sheets

(51) Int. Cl.
*G02B 27/10* (2006.01)
*G09G 5/00* (2006.01)
*G02F 1/1335* (2006.01)
*H04N 7/00* (2011.01)
*G02B 27/01* (2006.01)
*G02B 27/00* (2006.01)

(58) Field of Classification Search
CPC .. G02B 27/144; G02B 27/1013; G02B 23/02; G02B 23/18; G02B 5/045; G02B 27/0103; G02B 17/08
USPC ............... 359/630–639, 404, 407, 409–410, 359/618–619, 625, 13–14, 727, 732; 345/7, 9; 631/633, 640; 351/41–176, 351/205–206, 210, 221; 340/438, 980, 340/995.1, 815.47, 815.74; 349/11; 348/115; 353/11–12, 28, 119
See application file for complete search history.

(56) References Cited

U.S. PATENT DOCUMENTS

| | | | |
|---|---|---|---|
| 5,706,136 | A | 1/1998 | Okuyama et al. |
| 2002/0041445 | A1* | 4/2002 | Nishioka et al. ............. 359/627 |
| 2002/0047837 | A1* | 4/2002 | Suyama ............. G02B 27/2271 345/204 |
| 2002/0070904 | A1* | 6/2002 | Okuyama ..................... 345/7 |
| 2006/0215111 | A1* | 9/2006 | Mihashi ..................... 351/205 |
| 2007/0097690 | A1 | 5/2007 | Kuo et al. |
| 2007/0296644 | A1 | 12/2007 | Hong et al. |
| 2008/0062537 | A1 | 3/2008 | Liao |
| 2008/0094586 | A1 | 4/2008 | Hirayama |
| 2010/0171922 | A1* | 7/2010 | Sessner et al. ............... 351/158 |
| 2011/0043436 | A1* | 2/2011 | Yamamoto ..................... 345/8 |
| 2012/0081800 | A1* | 4/2012 | Cheng et al. ................. 359/720 |
| 2012/0162549 | A1 | 6/2012 | Gao et al. |
| 2015/0316748 | A1* | 11/2015 | Cheo ................... G02B 13/009 359/694 |

FOREIGN PATENT DOCUMENTS

| | | |
|---|---|---|
| KR | 10-2006-0031377 A | 4/2006 |
| KR | 10-2007-0100460 A | 10/2007 |
| KR | 10-2008-0044040 A | 5/2008 |
| WO | 2010/123934 A1 | 10/2010 |
| WO | 2012/032684 A1 | 3/2012 |

OTHER PUBLICATIONS

International Search Report, mailed Dec. 16, 2013, for International Application No. PCT/US2013/059207, 3 pages.
Written Opinion, mailed Dec. 16, 2013, for International Application No. PCT/US2013/059207, 11 pages.
Extended European Search Report, dated Jan. 29, 2016, for corresponding European Application No. 13803879.9-1562 / 2859403, 7 pages.
Patent Examination Report No. 1, issued Nov. 1, 2016, for corresponding AU Application No. 2013315607, 3 pages.
Chinese Office Action, mailed Aug. 17, 2016, for corresponding Chinese Application No. 201380058207.8, 11 pages (English translation).
Chinese Office Action, mailed Aug. 17, 2016, for corresponding Chinese Application No. 201380058207.8, 9 pages.
European Search Opinion, dated Mar. 18, 2016, for European Application No. 13 836 713.1, 6 pages.
First Examination Report of the New Zealand Intellectual Property Office, for New Zealand Patent Application No. 705984, dated Sep. 6, 2016, 7 pages.
International Preliminary Report on Patentability, dated Mar. 17, 2015, for International Application No. PCT/US2013/059207, 12 pages.

* cited by examiner

ERGONOMIC HEAD MOUNTED DISPLAY DEVICE AND OPTICAL SYSTEM

BACKGROUND

Technical Field

The present application relates generally to an optical see-through head-mounted display (OST-HMD) device, and more particularly, to ergonomically designed freeform optical systems for use as an optical viewing device in optical see-through HMDs with an eyeglass-form appearance and a wide see-through field of view (FOV).

Description of the Related Art

Head-mounted displays (HMD) have long been proven invaluable for many applications, spanning the fields of scientific visualization, medicine and military training, engineering design and prototyping, tele-manipulation and tele-presence, and personal entertainment systems. In mixed and augmented reality systems, optical see-through HMDs are one of the basic approaches to combining computer-generated virtual scene with the views of a real-world scene. Typically through an optical combiner, an OST-HMD optically overlays computer-generated images onto the real-world view while maintaining a direct, minimally-degraded view of the real world. An OST-HMD has a great potential for creating a mobile display solution that offers much more attractive image quality and screen size than other popular mobile platforms such as smart phones and PDAs.

On the other hand, despite much significant advancement on HMD designs over the past decades, there exist many technical and usability barriers preventing the technology from being widely accepted for many demanding applications and daily usage. One of the major barriers with HMDs is the cumbersome, helmet-like form factor that prevents the acceptance of the technology for many demanding and emerging applications. Few of the existing optical design methods applied is capable of creating a truly portable, compact, and lightweight HMD design that is nonintrusive and can be considered as being eyeglass-style near-eye displays. Heavy weight contributes to fatigue and discomfort, and is considered a major hindrance of HMD-based applications. Additionally, the ability to provide a wide, minimally blocked or degraded see-through FOV is essential for performing daily tasks. In recent year, freeform surfaces have been introduced to HMD system designs. For example, designs have been proposed in U.S. Pat. Nos. 5,699,194, 5,701,202, 5,706,136, and D. Cheng, et al., "Design of an optical see-through head-mounted display with a low f-number and large field of view using a freeform prism," Applied Optics, 48(14), 2009, aiming to reduce the system weight and create lightweight HMDs. However, there is still no solution available in today's market which meets both the ergonomic needs and performance needs. Approaches described in this application provide solutions with eyeglass form factors and wide see-through FOV, while maintaining a superior performance.

BRIEF SUMMARY

This application concerns an ergonomic optical see-through head mounted display (OST-HMD) device with an eyeglass-form appearance and freeform optical systems for use as an optical viewing device in such display devices. The optical viewing device in an OST-HMD typically provides an optical path for viewing a displayed virtual image and a see-through path for directly viewing a real-world scene. The virtual image path may include a miniature image display unit to supply display content and an ergonomically-shaped display viewing optics through which a user views a magnified image of the displayed content. The display viewing optics includes a light guiding device (referred to hereafter as a freeform waveguide prism) containing multiple freeform refractive and reflective surfaces. The display viewing optics may also include additional coupling optics to properly inject light from the image display device into the waveguide prism. The location and shape of the freeform surfaces and the coupling optics are sized, dimensioned, positioned and/or oriented such that a viewer is able to see a clear, magnified image of the displayed content. The see-through path of the head-mounted display device is provided by the waveguide prism and a freeform see-through compensation lens positioned (e.g., attached to) outwardly of an exterior surface of the prism. The see-through compensation lens, contains multiple freeform refractive surfaces, and enables proper viewing of the surrounding environment across a very wide see-through field of view. The waveguide prism and the see-through compensation lens are sized, dimensioned, positioned and/or oriented to ergonomically fit with the ergonomic factors of the human heads enabling a wrap-around design of a light-weight, compact, and see-through display system which has an eyeglass-form appearance, wide see-through field of view, and superior optical performance.

Various embodiments of freeform optical systems for use as an optical viewing device in an ergonomic head mounted display device are described herein. At least some of the freeform optical systems described herein are optimized to provide ergonomically shaped viewing optics that fit with the ergonomic factors of the human head, allowing them to be wrapped around a human face and present an eyeglass-like appearance instead of helmet-like appearance in prior HMD designs. Various embodiments also offer a see-through capability, allowing a user to view the surrounding environment through the viewing optics, as well as the displayed content on an image display device. At least some embodiments offer a see-through FOV that may be considerably larger than the FOV of the virtual view.

The virtual image path of the OST-HMD device may include a miniature image display unit for supplying display content and an ergonomically-shaped display viewing optics through which a user views a magnified image of the displayed content. The display viewing optics may include a freeform waveguide prism containing or having multiple freeform refractive and reflective surfaces. The display viewing optics may also include additional coupling optics. The waveguide prism serves as a near-eye viewing optic that magnifies the image on a miniature image display device. Light rays emanating from the image display unit are injected into the waveguide prism via the first refractive surface of the prism. The rays may be injected into the prism directly from the display device or through one or more coupling lenses. The injected rays propagate through the waveguide prism via multiple reflections (typically 3 or more) and are then coupled out of the prism via the second refractive surface of the prism. The outgoing rays continue propagating and reach the exit pupil of the system. The exit pupil may be the location at which a user places her/his eye to view the virtual content.

When light propagates through the waveguide prism while satisfying a Total Internal Reflection (TIR) condition on a reflective surface of the waveguide prism, the light loss through reflection is minimal. Therefore, it is desired, but not strictly required, that all of the reflections satisfy the TIR condition. However, it is also desirable to achieve thin designs of the waveguide prism. Such thin designs may compromise the TIR condition on some of the reflective surfaces.

For reflective surfaces located inside the designated see-through FOV of the device where the TIR condition is not satisfied, a semi-transparent coating is applied on these surfaces. The semi-transparent coating ensures that sufficient light from the miniature display unit reaches the exit pupil to produce a bright image, while facilitating the optical see-through capability. For reflective surfaces outside the see-through FOV of the device where the TIR condition is not satisfied, a high-reflection mirror coating can be applied on these surfaces to minimize light loss.

The miniature image display unit can be any type of self-emissive or illuminated pixel arrays that can serve as an image source, including, but not limited to, a liquid crystal on silicon (LCoS) display device, a liquid crystal display (LCD) panel, an organic light emitting display (OLED), Ferroelectric liquid crystal on silicon (FLCoS) device, digital mirror device (DMD), or a micro-projector built upon these aforementioned or other types of micro-display devices.

In at least some embodiments, the see-through path of the head-mounted display device is formed at least in part by the freeform waveguide prism and a freeform see-through compensation lens. The compensation lens is positioned (e.g., attached to) outwardly of the physical outer surface of the waveguide prism in order to counteract or accommodate for ray shift and/or distortion caused by the waveguide prism and to maintain a clear see-through view of a real-world scene. The compensation lens may include multiple (typically 2 or more) freeform refractive surfaces, enables proper viewing of the surrounding environment across a very wide field of view. The surfaces of the compensation lens may be optimized to minimize any shift and/or distortion of rays from a real-world scene when the lens is combined with the waveguide prism. If the reflection on the attached surfaces of the waveguide prism is to satisfy a TIR condition in the virtual image display path, it is necessary to maintain a small gap (e.g., air gap) between the waveguide prism and the compensation lens.

Various embodiments utilize multiple reflections to extend the optical path length, so that a width of the waveguide prism closely matches with a width of an average human head (e.g., interpupillary distance). The long optical path facilitates the ergonomic design of the waveguide prism, as well as maintaining a large see-through FOV. The long optical path of the prism also allows placement of the image display unit to a side of the display frame, reducing a front weight of the HMD system and improving ergonomic fit of the system.

Additionally, a shape of the waveguide prism, and shape of the optical viewing device as a whole, can be designed to approximate the natural curve of the human head for optimal ergonomic fit. For example, the prism shape in some embodiments is curved to approximate a curvature of a pair of 8-base curve eyeglasses. The prism shape in some other embodiments approximately follows the form factor of a pair of 4-base curve eyeglasses. Moreover, the overall thickness of the waveguide prism and the compensation lens is deliberately controlled to achieve a thin optical or optics profile (typically less than 30 mm). Overall, the deliberately controlled waveguide prism shapes, long optical path, and optics thickness enable a wraparound design of optical see-through HMDs that offers ergonomic fit with the human head and attractive eyeglass-like appearance.

At least some embodiments provide a very large see-through field of view, typically much larger than the FOV of the virtual display. This capability is enabled by several mechanisms. For instance, moving the image display device may be located or positioned to a side (e.g., left side, right side) of the head to extend the clear optical aperture of the waveguide prism. Also for instance, the freeform surfaces on the waveguide prism may be deliberately controlled. Additionally, or alternatively, a compensation lens may be employed to correct ray shifts and/or distortions and ensure high see-through performance across a large FOV. In some of the embodiments, the see-through FOV extends as large as 120-degrees in the horizontal direction and 80-degrees in the vertical direction. Thus, in some embodiments, the see-through FOV can be extended to match the field of view of human eyes.

Due to the inclusion of a long optical path, in order to match or accommodate the width or curvature of the human head, as well as to achieve large see-through FOV, the rays from the same point on the image display device will cross at least once inside the waveguide prism. Consequently, an intermediate image of the virtual display will be formed inside the waveguide prism. Such will be true even though the ray cross point may not be well formed and the cross points for different image points of the microdisplay usually do not form an image inside the waveguide prism.

At last some embodiments include adjustable focusing optics to adjust a focal plane of the system. The adjustable focusing optics enable a focus of the HMD viewing system to be changed according to application needs. For example, the focus may be selectively adjusted to a close range when the system is used for reading books. Also for example, the focus may be selectively adjusted to an intermediate range when the system is used for watching movies. As a further example, the focus may be selectively adjusted to a far distance when the system is used for guiding a driver of a vehicle. The adjustable focusing optics can take the form of, for example, a liquid lens or the like which allows adjustment or change of the focal plane in real time.

At least some embodiments create multiple focal planes in sequence by adjusting focus in a very fast speed, which adds the capability of creating multiple focal planes in the system. With multiple focal planes, content can be rendered in such a way that the system may operate substantially free of convergence and accommodation conflict issues.

DETAILED DESCRIPTION

Various embodiments according to the present invention will be fully described with respect to the attached drawings. The descriptions are set forth in order to provide an understanding of the invention. However, it will be apparent that the invention can be practiced without these details. Furthermore, the present invention may be implemented in various forms. However, the embodiments of the present invention described below shall not be construed as limited to the embodiments set forth herein. Rather, these embodiments, drawings and examples are illustrative and are meant to avoid obscuring the invention.

Figure 1:
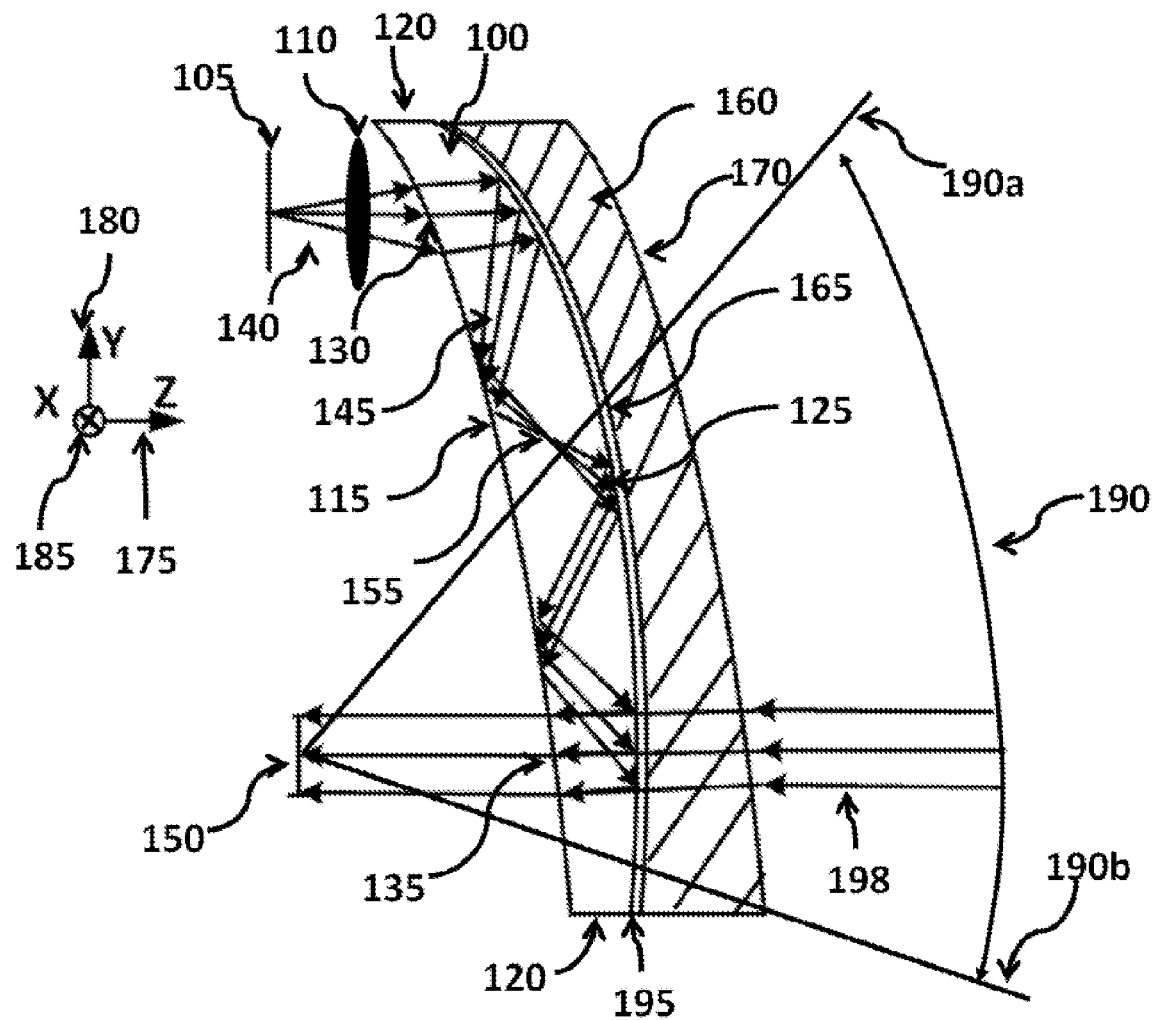
FIG. 1 is a schematic diagram of an optical system, for example an image display system, according to at least one illustrated embodiment of the present invention.

The various embodiments generally relate to ergonomically designed freeform optical systems for use as an optical viewing device in optical see-through HMDs with an eyeglass-form appearance and a wide see-through field of view (FOV). FIG. 1 shows an optical system in the form of an image display system which projects displayed virtual images into the user's eye pupil through a freeform optical waveguide prism while allowing the user to see displayed or projected content overlaid upon a real world scene.

The display system may include an image display unit 105. The image display unit 105 may take the form of a miniature image display unit, and serves as an image source, projecting light into a freeform optical waveguide prism 100.

The display system may optionally include a lens group 110. The lens group 110 includes one or more lenses that guide light from the display unit 105 into the freeform optical waveguide prism 100 and correct for optical aberrations.

The freeform optical waveguide prism 100 may be transparent, and as described herein, accepts the light from the display unit 105 and propagates the light until the image is projected into the user's eye pupil. The optical waveguide prism 100; also allows the light from a real-world scene to pass through and enter the user's eye pupil. The optical waveguide prism 100 has a physical inner or first major surface 115, physical peripheral edge or surface 120 and physical outer or second major surface 125. At least some portions of the first and/or the second major surfaces 115, 125 are refractive, for example a first refractive surface portion 130, and a second refractive surface portion 135. At least some portions of the first and/or the second major surfaces 115, 125 are reflective surfaces.

The display system may include a freeform compensation lens 160. The freeform compensation lens 160 is positioned outwardly toward an ambient environment with respect to the optical waveguide prism 100. In some embodiments the compensation lens 160 may be physically coupled to the optical waveguide prism 100, for example, secured to the physical outer or second major surface 125 of the optical waveguide prism 100. The compensation lens 160 corrects for optical distortion caused by viewing the real world through the optical waveguide prism. An inner physical or first major surface 165 of the compensation lens 160 has a shape which at least approximately matches a shape of the outer physical or second major surface 125 of the waveguide prism 100. The inner physical or first major surface 165 of the compensation lens 160 is spaced from the outer physical or second major surface 125 of the waveguide prism 100 to define a small gap 195 between the waveguide 100 and the compensation lens 160, at least on surfaces where the TIR criterion is satisfied for the outer physical or second major surface 125 of the optical waveguide prism 100. The compensation lens 160 is designed to compensate for the effect of ray shift and distortion caused by the optical waveguide prism 100 so that the user maintains a clear see-through field of view 190.

The image display unit 105 can be any type of self-emissive or illuminated pixel arrays that can serve as an image source. For example, the image display unit may take the form of, for example but not limited to, a liquid crystal on silicon (LCoS) display device, a liquid crystal display (LCD) panel, an organic light emitting display (OLED), ferroelectric liquid crystal on silicon (LCoS device, digital mirror device (DMD), or a micro-projector built upon these aforementioned or other types of micro-display devices.

The image display unit 105 transmits light 140 into the optional coupling lens 110 followed by the optical waveguide prism 100 or into the optical waveguide prism 100 directly, through a first refractive surface 130. The light 140 follows an optical path 145 along a length of the optical waveguide prism 100, that comprises a plurality of reflections from the first refractive surface 130 to the second refractive surface 135. The rays of the light 140 following the optical path 145 along the length of the optical waveguide prism may cross and form an intermediate image 155 inside the optical waveguide prism 100.

The light 140 subsequently passes through the second refractive surface 135, beyond which where the user places his or her pupil 150 to view the image.

The light from the real-world scene 198 passes through the compensation lens 160 and the optical waveguide prism 100 before reaching the pupil 150.

The device may advantageously employ an ergonomically shaped freeform optical waveguide prism 100, which enables an image to be projected into one refractive input surface of the prism, which is then reflected and refracted until the image reaches the user's eye. The shape, optical path length, and thickness of the optical waveguide prism 100 are deliberately optimized, enabling a wrapped-around design of optical see-through HMDs that offer ergonomic fit with the human head and attractive eyeglass-like appearance.

In a typical embodiment, the freeform optical waveguide prism comprises at least three physical surfaces each of which contains a plurality of reflective and refractive optical surfaces disposed upon the physical surfaces. The interior space of the physical surfaces is filled by a refractive medium having an index (n) greater than 1. The physical and optical surfaces may include one or more of: a physical inner or first major surface 115, physical outer or second major surface 125, physical edge surface 120. The physical inner or first major surface 115 and/or physical outer or second major surface 125 may include a refractive input surface portion 130, a refractive output surface portion 135, and/or plurality of reflective surface portions.

The physical inner or first major surface 115 is disposed inwardly, towards the eyeball of the user or foci point of the device. The physical inner or first major surface 115 includes a plurality of reflective and refractive surface portions appropriate to propagating an image to the eyeball of the user via internal reflection in the optical waveguide prism 100. The optical waveguide prism 100 is constrained to fit the ergonomic factors of the human head.

The physical outer or second major surface 125 is disposed outwardly, towards an external scene or real world ambient environment. The physical outer or second major surface 125 includes a plurality of reflective surface portions appropriate to reflecting an image to the eyeball of the user. The physical outer or second major surface 125 is within typically 30 mm of the inner or first major surface 115 at all points. The physical outer or second major surface 125 includes at least one refractive surface that allows light from the external scene or real world ambient environment to pass through the optical waveguide prism 100 and reach the eyeball of the user.

The physical edge surface 120 may potentially contain a refractive surface. The refractive surface may, for example, allow light from an image display unit to enter the waveguide.

The refractive input surface portion 130 is disposed on or constitute one of the physical surfaces. The refractive input surface portion 130 may allow light from an image display unit to enter the waveguide.

The refractive output surface portion 135 allows light to exit the optical waveguide prism 100. The refractive output surface portion 135 is disposed upon or constitute the physical inner or first major surface, near the pupil of the user. The refractive surface portion may, or may not, be covered by a semi-transparent coating.

The plurality of reflective surface portions are disposed upon or constitute the physical inner or first major surface and outer or second major surface. Each reflection is produced by either satisfying the TIR condition, or by the application of a semi-transparent, partially reflective coating to at least a portion of a surface of the optical waveguide prism 100.

The light 140 from an image display unit 105 enters the optical waveguide prism 100, through a first refractive surface 130. The light 140 follows an optical path 145 along a length of the optical waveguide prism 100. The optical path 145 includes a plurality of reflections, upon the plurality of reflective surface portions, for example from the first refractive surface portion 130 to the second refractive surface portion 135. As previously noted, each reflection is produced either by satisfying conditions of Total Internal Reflection, or by the application of a semi-transparent coating to the surface.

Subsequently, the light 140 passes through the second refractive surface portion 135, beyond which where the user places his or her pupil 150 to view the image.

The light 198 from the ambient environment real-world scene, after being refracted by the compensation lens 160, is refracted through the physical outer or second major surface 125 of the optical waveguide prism 100 and the physical inner or first major surface 115 of the optical waveguide prism before reaching the pupil 150.

In a typical embodiment, the inner or first major surface 115 and the outer or second major surface 125 of the optical waveguide prism 100 is appropriately designed to produce a plurality of reflections that guide light towards the user's pupil without distorting the image. The plurality of reflections extends the optical path length so that the width of the optical waveguide prism 100 closely fits with a width of an average human head. The relatively long optical path length enables the design of the optical waveguide prism into an ergonomic shape. The relatively long optical path of the optical prism waveguide 100 further allows locating or positioning the image display unit 105 to a side of the display frame. Such may advantageously reduce a front weight of the HMD system and improve the ergonomic fit of the resulting system.

In a typical embodiment, the inner or first major surface 115 is constrained to approximate a pre-designated curved surface for the desired eyeglass form factor. The outer or second major surface 125 is further constrained to achieve a thin profile with a thickness of typically no more than 30 mm between the inner or first major surface 115 and outer or second major surface 125. In at least one embodiment, an overall thickness between the inner or first major surface 115 and outer or second major surface 125 was constrained to be no more than 12 mm. The parameters of the inner or first major surface 115 and the outer or second major surface 125 of the optical waveguide prism 100 are hence optimized, the image to be projected having minimal distortion at an exit point or location of the optical waveguide prism 100.

In a typical embodiment, the inner or first major surface 115 of the optical waveguide prism 100 may contain multiple surface segments; each surface segment described by one unique set of parameters.

In a typical embodiment, the outer or second major surface 125 of the optical waveguide prism 100 may contain multiple surface segments; each surface segment described by one unique set of parameters.

In some embodiments, a coupling lens 110 may be added between the miniature image display unit 105 and the first refractive surface portion 130 of the optical waveguide prism 100, facilitating transmission of the light from the display unit 105 into the optical waveguide prism 100. The coupling lens 110 may, for example, be used to correct for optical aberrations of the optical waveguide prism 100.

The freeform see-through compensation lens 160 may be physically attached to the optical waveguide prism 100. The compensation lens 160 is designed to counteract the ray shift and distortion caused by the optical waveguide prism 100, enabling a clear see-through view of a real-world scene across a wide field of view.

In a typical embodiment, the freeform compensation lens 160 includes multiple (typically 2 or more) freeform refractive surfaces. An interior space between the refractive surfaces of the compensation lens 160 is filled by a refractive medium having an index (n) greater than 1. The optical surfaces of the compensation lens 160 may include: a refractive inner or first major surface 165 and a refractive outer or second major surface 170.

The refractive outer or second major surface 170 is disposed outwardly, towards the external scene. The refractive outer or second major surface 170 allows light 198 from the external scene to enter the compensation lens 160. The refractive outer or second major surface 170 is typically a continuous, single refractive surface. The refractive outer or second major surface 170 is within typically 30 mm of the physical inner surface 115 of the optical waveguide prism 100 at all points.

The refractive inner or first major surface 165 is disposed towards the outer or second major surface 125 of the optical waveguide prism 100. The refractive inner or first major surface 165 allows light to exit the compensation lens 160, and enter into the optical waveguide prism 100. The refractive inner or first major surface 165 may include a plurality of refractive surface portions. The refractive inner or first major surface 165 is typically constrained to approximate or match a shape of the outer or second major surface 125 of the optical waveguide prism 100.

In use, light from the real-world scene 198 is in turn refracted through the refractive outer surface 170 and the refractive inner surface 165 of compensation lens 160, the physical outer surface 125 and the physical inner surface 115 of the optical waveguide prism 100, before reaching the pupil 150.

In a typical embodiment, the compensation lens 160 and the optical waveguide prism 100 are deliberately optimized together to enable proper viewing of the surrounding environment across a very wide field of view 190. The inner surface 165 and outer surface 170 of the compensation lens 160 are optimized to minimize the shift and distortion introduced to the rays from a real-world scene when the compensation lens 160 is combined with the waveguide prism 100. The inner surface 165 of the compensation lens 160 could be an exact duplicate of the outer surface 125 of the waveguide prism 100 with a small off-set along the z axis. If a reflection on the attached outer surface 125 of the waveguide prism 100 satisfies the TIR condition in the virtual image display path, it is necessary to maintain a small air gap 195 between the waveguide prism 100 and the compensation lens 160. If there is no TIR requirement on the outer surface 125 of the optical waveguide prism 100, the index matching glue can fill in what would otherwise be the air gap 195, to cement the compensation lens 160 with the waveguide prism 100. The inner surface 165 of the compensation lens 160 can also be redesigned along with the outer surface 170 of the compensation lens 160 for better see-through performance. For this case, the gap 195 between the optical waveguide prism 100 and the compensation lens 160 may be constrained to be less than 6 mm at any points along the surfaces. The outer surface 170 is further constrained to limit an overall thickness of the optical waveguide prism 100 and the compensation lens 160 to be typically no more than 30 mm. In at least some embodiments, the overall thickness of the optical waveguide prism 100 and compensation lens 160 is constrained to be no more than 15 mm. Both the inner surface 165 and the outer surface 170 of the compensation lens 160 should be sufficiently large for the designated see-through FOV 190. The shape and the thickness of the compensation lens 160 are deliberately optimized, enabling a wrapped-around design of optical see-through HMDs that offer ergonomic fit with the human head and attractive eyeglass-like appearance.

In a typical embodiment, the inner and outer surfaces of the compensation lens 160 and waveguide prism 100 are sufficiently large to enable a wide see-through field of view 190 as large as the visual field of the human eye, for example, relative to the center of the field of view, up to 90° on the temple side and 60° on the nasal side in the horizontal direction, and up to 60° superiorly and inferiorly in the vertical direction. The freeform surfaces on the optical waveguide prism 100 and compensation lens 160 are optimized to correct ray shifts and distortions to ensure high see-through performance across a large FOV.

All the above mentioned surfaces are free-form surfaces, including, but not limited to, spherical, aspheric, anamorphic aspheric, XYP polynomial or any other types of mathematical prescriptions, which is asymmetric in YZ plane of the global coordinate as shown in FIG. 1, where the origin of the coordinate system is located at the center of the exit pupil 150 with Z axis 175 pointing to the external scene, Y axis 180 pointing to the temple side, and X axis 185 pointing vertically along the head. Throughout this disclosure, without special notification, the same coordinate system is used for all the drawings and the descriptions.

The teachings herein may advantageously provide freeform optical systems for use as an optical viewing device in optical see-through HMDs, achieving an eyeglass-form appearance and a wide see-through field of view (FOV). As such, designing the waveguide prism may include optimizing the parameters of each individual surface to minimize proper optical error function, for example, wavefront error or system modulation transfer functions (MTF). The optical waveguide prism 100 illustrated in FIG. 1 contains multiple freeform surfaces which offer more design freedom than that of the traditional rotationally symmetric optical surfaces. Therefore, the freeform design approach allows the design of optical viewing devices with better optical performance and ergonomic fit. Such may be achieved while using fewer surfaces as compared with optical viewing devices of the similar specifications that use the traditional rotationally symmetric optical surfaces. However, proper constraints must be applied on all of the surfaces in order to have a valid design of the optical waveguide prism, while maintaining a desired form factor and providing a large see-through FOV.

Figure 2:
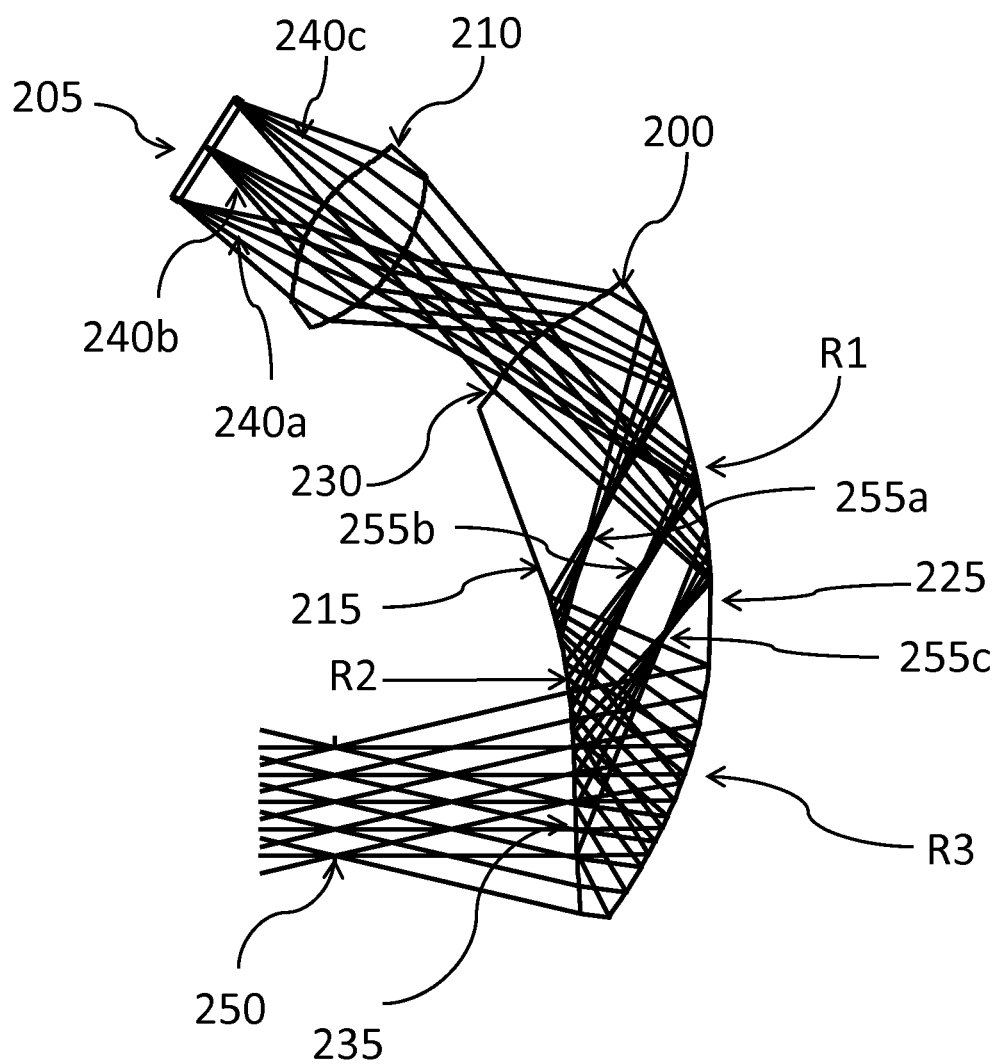
FIG. 2 is a schematic diagram of a portion of the optical system of FIG. 1, showing a 3-reflection embodiment of an optical waveguide prism, which approximates an 8-base curve wraparound appearance, according to at least one illustrated embodiment.

FIG. 2 shows a 3-reflection embodiment of the optical waveguide prism 200, according to one illustrated embodiment with an 8-base curve wraparound appearance. This embodiment can be used to implement an HMD system with an 8-base curve wraparound form factor. In this embodiment, an inner physical or first major surface 215 and the outer physical or second major surface 225 of the optical waveguide prism 200 are two continuous, smooth surfaces, each of which are described by a set of freeform surface parameters. A refractive surface portion 230 of the optical waveguide prism 200 is not a part of the inner surface 215, and is described by a different set of surface parameters. A micro-display panel 205, can be either a reflective type micro-display (e.g., LCoS, FLCoS, or DMD panels) or a transmissive type micro-display (e.g., LCD panel) or a self-emissive type micro-display (e.g., OLED panel). In the case of a reflective type micro-display panel, a beamsplitter (not shown) is employed to introduce an illumination path (not shown). Between the image display 205 and the optical waveguide prism 200, a coupling lens 210 is used to help correct optical aberrations and improve image qualities. In this design example, the ray bundles 240a, 240b and 240c originated from three different pixels on the micro-display 205 enter the optical waveguide prism 200 through the refractive surface 230, are reflected three times by the inner surfaces 215 and the outer surface 225, and are then transmitted through the refractive surface 235 to reach the exit pupil 250. In this example, among the three reflections, the reflections R1 and R2 satisfy the TIR condition and the reflection R3 on the outer surface 225 does not satisfy the TIR condition. In order to increase the reflective efficiency for the reflection R3, a semi-transparent coating is applied on at least a corresponding portion of the outer surface 225. In order to maintain TIR condition for the reflection R1, a dielectric coating is preferred. Inside the optical waveguide prism 200, the ray bundles 240a, 240b and 240c are refocused and form intermediate images 255a, 255b and 255c, respectively.

To provide an adjustable focusing function, the coupling lens 110 in FIG. 1 is replaced with a liquid lens or a lens group containing a liquid lens. For the embodiment in FIG. 2, the coupling lens can be replaced by a liquid lens or a group of lens containing a liquid lens to adjust the focusing.

The various embodiments described above can be combined to provide further embodiments. U.S. patent application Ser. No. 61/699,565 filed Sep. 11, 2012 in the name of Chunyu Gao is incorporated herein by reference, in its entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image display system, comprising:
   a freeform optical waveguide prism having a first major surface and a second major surface, the first major surface of the optical waveguide prism which in use is positioned to at least one of receive actively projected images into the optical waveguide prism from an active image source or emit the actively projected images out of the optical waveguide prism and the second major surface of the optical waveguide prism which in use is positioned to receive images of a real-world ambient environment into the optical waveguide prism, which real-world ambient environment is external to the image display system, at least some portions of the first and the second major surfaces of the optical waveguide prism being refractive surfaces that internally propagate light entering the optical waveguide prism along at least a portion of a length of the optical waveguide prism;

a freeform compensation lens having a first major surface and a second major surface, the first major surface of the compensation lens having a shape that at least approximately matches a shape of the second major surface of the optical waveguide prism, the freeform compensation lens positioned relatively outwardly of the second major surface of the optical waveguide toward the real-world ambient environment to form a gap between the first major surface of the compensation lens and the second major surface of the optical waveguide prism; and at least one coupling lens located between an image display unit and the freeform optical waveguide prism, the at least one coupling lens to guide light from the image display unit into the optical waveguide prism and correct for optical aberrations, the at least one coupling lens comprising a liquid lens which is selectively adjustable to adjust a focal plane of the image display system.

2. The image display system of claim 1 wherein the refractive surfaces internally propagate light entering the optical waveguide prism at angles greater than a critical angle along at least the portion of the length of the optical waveguide prism via total internal reflection.

3. The image display system of claim 1 wherein at least a portion of at least one of the first or the second major surfaces of the optical waveguide prism bears a semi-transparent, partially reflective material.

4. The image display system of claim 1 wherein the optical waveguide prism has a peripheral edge extending between the first and the second major surfaces of the optical waveguide prism and which retains at least a portion of light within the optical waveguide prism.

5. The image display system of claim 1 wherein the gap between the first major surface of the compensation lens and the second major surface of the optical waveguide prism is a small gap.

6. The image display system of claim 1 wherein the gap between the first major surface of the compensation lens and the second major surface of the optical waveguide prism has a width that increases from at least proximate an entry location at which actively projected images enter into the optical waveguide prism to at least proximate an exit location at which the actively projected images exit the optical waveguide prism.

7. The image display system of claim 1 wherein the optical waveguide prism and the compensation lens focus images of the real-world ambient environment to a foci that is coincident with actively projected images which exit the optical waveguide prism via an exit location on the first major surface of the optical waveguide prism.

8. The image display system of claim 7 wherein the exit location on the first major surface of the optical waveguide prism is spaced along a length of the optical waveguide prism from an entry location on the first major surface of the optical waveguide prism at which actively projected images enter into the optical waveguide prism.

9. The image display system of claim 1 wherein the compensation lens compensates for ray shift and distortion of the images of the real-world ambient environment caused by the optical waveguide prism.

10. The image display system of claim 1 wherein rays of light forming the actively projected images cross and form an intermediate image inside the optical waveguide prism.

11. The image display system of claim 1, further comprising:
an image display unit positioned and oriented to provide images into the optical waveguide prism.

12. The image display system of claim 11 wherein the image display unit is at least one of a self-emissive pixel array or an illuminated pixel array.

13. The image display system of claim 11 wherein the image display unit is selected from the group consisting of: a liquid crystal on silicon (LCoS) display device, a liquid crystal display (LCD) panel, an organic light emitting display (OLED), ferroelectric liquid crystal on silicon (LCoS device, digital mirror device (DMD), and a micro-projector.

14. The image display system of claim 11, further comprising:
a matching cement received in the gap, securely coupling the compensating lens to the optical waveguide prism.

15. An image display system, comprising:
a freeform optical waveguide prism of a material having an index greater than one, a first major surface, a second major surface, and a peripheral edge that extends between a perimeter of the first major surface and a perimeter of the second major surface of the optical waveguide prism, the optical waveguide prism having an entry location on the first major surface of the optical waveguide prism at which actively projected images enter into the optical waveguide prism and an exit location on the first major surface of the optical waveguide prism at which the actively projected images exit the optical waveguide prism after a plurality of internal reflections along an optical path within the optical waveguide prism, the exit location is spaced along a length of the optical waveguide prism from the entry location;

an image display unit positioned and oriented to provide images into the optical waveguide prism; and at least one coupling lens located between an image display unit and the freeform optical waveguide prism, the at least one coupling lens to guide light from the image display unit into the optical waveguide prism and correct for optical aberrations, the at least one coupling lens comprising a liquid lens that adjusts a focus of the at least one coupling lens at a speed sufficient to create two or more focal planes that are free from humanly perceptible conflicts between convergence and accommodation.

16. The image display system of claim 15 wherein at least some portions of the first and the second major surfaces of the optical waveguide prism being refractive surfaces that internally propagate light entering the optical waveguide prism at angles greater than a critical angle along at least a portion of a length of the optical waveguide prism via total internal reflection.

17. The image display system of claim 15 wherein at least a portion of at least one of the first or the second major surfaces of the optical waveguide prism bears a semi-transparent, partially reflective material.

18. The image display system of claim 15 wherein the first major surface of the optical waveguide prism is positioned to receive actively projected images into the optical waveguide prism from an active image source and the second major surface of the optical waveguide prism is positioned to receive images of a real-world ambient environment into the optical waveguide prism, which real-world ambient environment is external to the image display system.

19. The image display system of claim 15, further comprising:
a freeform compensation lens having a first major surface and a second major surface, the first major surface of the compensation lens having a shape that at least approximately matches a shape of the second major surface of the optical waveguide prism, the freeform compensation lens positioned relatively outwardly of the second major surface of the optical waveguide prism toward the real-world ambient environment to form a gap between the first major surface of the compensation lens and the second major surface of the optical waveguide prism.

20. The image display system of claim 15 wherein a shape, an optical path length, and a thickness of the optical waveguide prism are optimized for a wrapped-around design that ergonomic fits a human head.

21. The image display system of claim 15 wherein a width of the optical waveguide prism at least approximately fits a width of an average human head.

22. The image display system of claim 15 wherein the first major surface of the optical waveguide prism is curved about an axis.

23. The image display system of claim 15 wherein each point on the second major surface of the optical waveguide prism is no greater than 30 mm of a corresponding point on the first major surface of the optical waveguide prism.

24. The image display system of claim 15 wherein each point on the second major surface of the optical waveguide prism is no greater than 12 mm of a corresponding point on the first major surface of the optical waveguide prism.

25. The image display system of claim 15 wherein the second major surface of the optical waveguide prism comprises a plurality of surface segments, each surface segment having a unique set of parameters.

26. A method for at least one image display comprising a freeform optical waveguide prism of a material having an index greater than one, a first major surface, a second major surface, and a peripheral edge that extends between a perimeter of the first major surface and a perimeter of the second major surface of the optical waveguide prism, the optical waveguide prism having an entry location on the first major surface of the optical waveguide prism and an exit location on the first major surface of the optical waveguide prism, the exit location being spaced along a length of the optical waveguide prism from the entry location, the method comprising:
actively projecting, by at least one image display unit positioned and oriented to provide images into the optical waveguide prism, images at the entry location on the first major surface of the optical waveguide prism such that the actively projected images exit the optical waveguide prism at the exit location on the first major surface of the optical waveguide prism after a plurality of internal reflections along an optical path within the optical waveguide prism;
guiding, by at least one coupling lens comprising a liquid lens located between the image display unit and the optical waveguide prism, light from the image display unit into the optical waveguide prism; and
adjusting, by the liquid lens, a focus of the at least one coupling lens at a speed sufficient to create two or more focal planes that are free from humanly perceptible conflicts between convergence and accommodation.

27. The method of claim 26, further comprising:
internally propagating, by the refractive surfaces, light entering the optical waveguide prism at angles greater than a critical angle along at least the portion of the length of the optical waveguide prism via total internal reflection.

28. The method of claim 26, further comprising:
focusing, by the optical waveguide prism and the compensation lens, images of the real-world ambient environment to a foci that is coincident with actively projected images which exit the optical waveguide prism via an exit location on the first major surface of the optical waveguide prism.

29. The method of claim 26, further comprising:
compensating, by the compensation lens, for ray shift and distortion of the images of the real-world ambient environment caused by the optical waveguide prism.

30. The method of claim 26, further comprising:
securely coupling, by a matching cement received in the gap, the compensating lens to the optical waveguide prism.

* * * * *